US012407886B2

(12) United States Patent
Kameoka et al.

(10) Patent No.: US 12,407,886 B2
(45) Date of Patent: Sep. 2, 2025

(54) VIDEO DISTRIBUTION APPARATUS, VIDEO DISTRIBUTION METHOD, AND VIDEO DISTRIBUTION PROGRAM

(71) Applicants: Sony Interactive Entertainment Inc., Tokyo (JP); Sony Group Corporation, Tokyo (JP)

(72) Inventors: Shinpei Kameoka, Kanagawa (JP); Masaomi Nishidate, Tokyo (JP); Norihiro Nagai, Kanagawa (JP); Norihiro Takahashi, Tokyo (JP); Kae Nagano, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/572,790

(22) PCT Filed: Jun. 30, 2021

(86) PCT No.: PCT/JP2021/024851
§ 371 (c)(1),
(2) Date: Dec. 21, 2023

(87) PCT Pub. No.: WO2023/276076
PCT Pub. Date: Jan. 5, 2023

(65) Prior Publication Data
US 2024/0340482 A1    Oct. 10, 2024

(51) Int. Cl.
*H04N 21/258* (2011.01)
*H04N 21/475* (2011.01)

(52) U.S. Cl.
CPC ... *H04N 21/25891* (2013.01); *H04N 21/4755* (2013.01)

(58) Field of Classification Search
CPC ............. H04N 21/4788; H04N 21/435; H04N 21/4532; H04N 21/4316
See application file for complete search history.

(56) References Cited

U.S. PATENT DOCUMENTS

| 2009/0164484 | A1* | 6/2009 | Horowitz | H04N 21/8133 |
| 2014/0012910 | A1* | 1/2014 | White | H04N 21/4355 |
| | | | | 709/204 |
| 2014/0013200 | A1* | 1/2014 | White | H04N 21/235 |
| | | | | 715/230 |

FOREIGN PATENT DOCUMENTS

| JP | 2007-267173 A | 10/2007 |
| JP | 2010-141749 A | 6/2010 |

(Continued)

OTHER PUBLICATIONS

International Preliminary Report on Patentability issued Jan. 11, 2024 in corresponding International Patent Application No. PCT/JP2021/024851.

(Continued)

*Primary Examiner* — Jason Salce
(74) *Attorney, Agent, or Firm* — Kilpatrick Townsend & Stockton LLP

(57) ABSTRACT

A comment that can easily arouse viewer's interest and attention to a game video can be outputted. An attribute information acquisition section acquires viewer attribute information which indicates an attribute of a viewer who has made access to a video distribution apparatus. A comment information selection section selects at least one of a plurality of comment information items associated with a predetermined scene included in a video, on the basis of the viewer attribute information. A comment output section outputs a comment that is based on the selected comment information, together with the predetermined scene included in the video.

13 Claims, 13 Drawing Sheets

(56) References Cited

FOREIGN PATENT DOCUMENTS

| | | |
|---|---|---|
| JP | 2010-152813 A | 7/2010 |
| JP | 2011-118730 A | 6/2011 |
| JP | 2020-031903 A | 3/2020 |
| JP | 2021-007052 A | 1/2021 |
| WO | 2015/156177 A1 | 10/2015 |

OTHER PUBLICATIONS

Written Opinion of the International Searching Authority issued Sep. 28, 2021 in corresponding International Patent Application No. PCT/JP2021/024851.

International Search Report and Written Opinion mailed on Sep. 28, 2021, received for PCT Application PCT/JP2021/024851, filed on Jun. 30, 2021, 10 pages including English Translation.

* cited by examiner

FIG.5

| USER A | USER B | USER C | USER D |
|---|---|---|---|
| FPS GAME X<br>GAME LV: 22<br>PLAY TIME: 18<br>TODAY'S TOTAL NO.<br>OF TIMES OF PLAYS:<br>10 | FPS GAME X<br>GAME LV: 10<br>PLAY TIME: 8<br>TODAY'S TOTAL NO.<br>OF TIMES OF PLAYS:<br>1 | | |
| PUZZLE GAME Y<br>RANK: 700<br>PLAY TIME: 900 | | PUZZLE GAME Y<br>RANK: 60<br>PLAY TIME: 48 | |
| FIGHTING GAME Z<br>NO. OF CLEARED<br>MATCHES: 600<br>PLAY TIME: 400 | | | FIGHTING GAME Z<br>NO. OF CLEARED<br>MATCHES: 3<br>PLAY TIME: 5 |
| IN S PREFECTURE | IN S PREFECTURE | IN T PREFECTURE | IN T PREFECTURE |
| PROFESSIONAL<br>BASEBALL TEAM H<br>NO. OF REACTIONS:<br>22 | PROFESSIONAL<br>BASEBALL TEAM H<br>NO. OF REACTIONS:<br>19 | PROFESSIONAL<br>BASEBALL TEAM L<br>NO. OF REACTIONS:<br>5 | |
| PROFESSIONAL<br>BASEBALL PLAYER I<br>NO. OF REACTIONS:<br>1 | PROFESSIONAL<br>BASEBALL PLAYER I<br>NO. OF REACTIONS:<br>6 | | |
| IDOL R<br>NO. OF REACTIONS:<br>24 | | | IDOL R<br>NO. OF REACTIONS:<br>120 |
| PROFESSIONAL<br>GAMER S<br>NO. OF REACTIONS:<br>5 | | PROFESSIONAL<br>GAMER S<br>NO. OF REACTIONS:<br>10 | |
| VISITED O<br>PREFECTURE<br>LAST WEEK | | | VISITED O<br>PREFECTURE<br>LAST WEEK |
| ⋮ | ⋮ | ⋮ | ⋮ |

FIG.6

| USER B | USER C | USER D |
|---|---|---|
| FPS GAME X<br>GAME LV: 10<br>PLAY TIME: 8<br>TODAY'S TOTAL NO. OF TIMES OF PLAYS: 1 | | |
| | PUZZLE GAME Y<br>RANK: 60<br>PLAY TIME: 48 | |
| | | FIGHTING GAME Z<br>NO. OF CLEARED MATCHES: 3<br>PLAY TIME: 5 |
| IN S PREFECTURE | | |
| PROFESSIONAL BASEBALL TEAM H<br>NO. OF REACTIONS: 19 | PROFESSIONAL BASEBALL TEAM L<br>NO. OF REACTIONS: 5 | |
| PROFESSIONAL BASEBALL PLAYER I<br>NO. OF REACTIONS: 6 | | |
| | | IDOL R<br>NO. OF REACTIONS: 120 |
| | PROFESSIONAL GAMER S<br>NO. OF REACTIONS: 10 | |
| | | VISITED O PREFECTURE LAST WEEK |
| ⋮ | ⋮ | ⋮ |

FIG. 7

| | | | | |
|---|---|---|---|---|
| E1 | THIS IS TODAY'S N-TH PLAY. YOU'RE ABSORBED IN THIS GAME. | THIS GAME IS COMPLETELY DIFFERENT FROM [PUZZLE GAME]. CAN YOU REALLY PLAY? | YOU HAVE EXPERIENCED HAND-TO-HAND BATTLES IN [FIGHTING GAME]. DEMONSTRATE YOUR SKILLS! | |
| E2 | DON'T YOU GET TIRED? YOU DON'T KNOW WHEN TO GIVE UP. | IT DOESN'T GO LIKE [PUZZLE GAME]. | [PROFESSIONAL GAMER] YOU ADMIRE IS OUT OF YOUR LEAGUE. | ARE YOU STILL ON VACATION MODE IN [PREFECTURE]? |
| E3 | FANS OF [PROFESSIONAL BASEBALL TEAM] DO WHATEVER IT TAKES TO GET ITEMS. | YOU ARE MISERABLY DESPERATE. YOU WILL RUMMAGE THROUGH GARBAGE IN ORDER TO BECOME [PROFESSIONAL GAMER]. | YOU ARE HUNGRILY HUNTING AS IF YOU WERE LOOKING FOR SOUVENIRS FROM [PREFECTURE]. | |
| E4 | IT'S GONE! GREAT HOME RUN! | GREAT KNOCKOUT! | PERFECT! YOU GOT ONE STEP CLOSER TO [PROFESSIONAL GAMER]? | HEADSHOT DEDICATED TO [IDOL]! |
| E5 | [N]-TH TIME LUCKY. YOU FINALLY WON. IT IS GOOD. | ANYTHING IN COMMON WITH [PUZZLE GAME]? ANYWAY, IT IS NICE YOU WIN. | YOU WIN. [IDOL] IS SMILING. | |

FIG.8

| | | |
|---|---|---|
| FPS GAME | GAME LEVEL: ≥20<br>GAME LEVEL: ≥5<br>GAME LEVEL: <5 | DEG. OF INTEREST: HIGH<br>DEG. OF INTEREST: MEDIUM<br>DEG. OF INTEREST: LOW |
| PUZZLE GAME | PLAY TIME: ≥30<br>PLAY TIME: ≥10<br>PLAY TIME: <10 | DEG. OF INTEREST: HIGH<br>DEG. OF INTEREST: MEDIUM<br>DEG. OF INTEREST: LOW |
| FIGHTING GAME | PLAY TIME: ≥30<br>PLAY TIME: ≥10<br>PLAY TIME: <10 | DEG. OF INTEREST: HIGH<br>DEG. OF INTEREST: MEDIUM<br>DEG. OF INTEREST: LOW |
| PROFESSIONAL BASEBALL TEAM | NO. OF REACTIONS: ≥15<br>NO. OF REACTIONS: ≥5<br>NO. OF REACTIONS: <5 | DEG. OF INTEREST: HIGH<br>DEG. OF INTEREST: MEDIUM<br>DEG. OF INTEREST: LOW |
| PROFESSIONAL BASEBALL PLAYER | NO. OF REACTIONS: ≥15<br>NO. OF REACTIONS: ≥5<br>NO. OF REACTIONS: <5 | DEG. OF INTEREST: HIGH<br>DEG. OF INTEREST: MEDIUM<br>DEG. OF INTEREST: LOW |
| PROFESSIONAL GAMER | NO. OF REACTIONS: ≥15<br>NO. OF REACTIONS: ≥5<br>NO. OF REACTIONS: <5 | DEG. OF INTEREST: HIGH<br>DEG. OF INTEREST: MEDIUM<br>DEG. OF INTEREST: LOW |
| IDOL | NO. OF REACTIONS: ≥15<br>NO. OF REACTIONS: ≥5<br>NO. OF REACTIONS: <5 | DEG. OF INTEREST: HIGH<br>DEG. OF INTEREST: MEDIUM<br>DEG. OF INTEREST: LOW |
| ⋮ | ⋮ | ⋮ |

FIG.9

| USER B | USER C | USER D |
|---|---|---|
| FPS GAME X<br>GAME LEVEL: 10<br>PLAY TIME: 8<br>TODAY'S TOTAL NO. OF TIMES OF PLAYS: 1<br>(DEG. OF INTEREST: MEDIUM) | | |
| | PUZZLE GAME Y<br>RANK: 60<br>PLAY TIME: 48<br>(DEG. OF INTEREST: HIGH) | |
| | | FIGHTING GAME Z<br>NO. OF CLEARED MATCHES: 3<br>PLAY TIME: 5<br>(DEG. OF INTEREST: LOW) |
| IN S PREFECTURE<br>(DEG. OF INTEREST: MEDIUM) | | |
| PROFESSIONAL BASEBALL TEAM H<br>NO. OF REACTIONS: 19<br>(DEG. OF INTEREST: HIGH) | PROFESSIONAL BASEBALL TEAM L<br>NO. OF REACTIONS: 5<br>(DEG. OF INTEREST: LOW) | |
| PROFESSIONAL BASEBALL PLAYER I<br>NO. OF REACTIONS: 6<br>(DEG. OF INTEREST: LOW) | | |
| | | IDOL R<br>NO. OF REACTIONS: 120<br>(DEG. OF INTEREST: HIGH) |
| | PROFESSIONAL GAMER S<br>NO. OF REACTIONS: 10<br>(DEG. OF INTEREST: MEDIUM) | |
| | | VISITED O PREFECTURE LAST WEEK<br>(DEG. OF INTEREST: MEDIUM) |
| ⋮ | ⋮ | ⋮ |

VIDEO DISTRIBUTION APPARATUS, VIDEO DISTRIBUTION METHOD, AND VIDEO DISTRIBUTION PROGRAM

CROSS-REFERENCE TO RELATED APPLICATION

The present application is based on PCT filing PCT/JP2021/024851, filed Jun. 30, 2021, the entire contents of which are incorporated herein by reference.

TECHNICAL FIELD

The present disclosure relates to a video distribution apparatus, a video distribution method, and a video distribution program.

BACKGROUND ART

Video sharing services using a network such as the Internet have been known. Through a video sharing service, videos posted on a server on the network by users can be viewed by other users. Videos of this type include a game video that is obtained by recording a game play, for example.

PTL 1 discloses that associating information for identifying a game event with a game video reproduction time enables outputting of related information related to the event at the game video reproduction time. In addition, PTL 1 further discloses that outputting of a comment that matches the event is enabled.

CITATION LIST

Patent Literature

[PTL 1]
Japanese Patent Laid-Open No. 2021-007052

SUMMARY

Technical Problem

For example, in a case where a comment that matches a game event is mechanically associated with a game video, even when the comment is outputted during reproduction of the game video, the comment does not necessarily arouse user's (viewer's) interest and attention. In this case, there is a concern that viewers lose their interests and attentions to a game video.

An object of the present disclosure is to output a comment that can easily arouse viewer's interest and attention to a game video.

Solution to Problem

A video distribution apparatus according to the present disclosure is a video distribution apparatus for distributing a video to a viewer, the video distribution apparatus including attribute information acquisition means that acquires viewer attribute information which indicates an attribute of a viewer who has made access to the video distribution apparatus, comment information selection means that selects at least one of a plurality of comment information items associated with a predetermined scene included in the video, on the basis of the viewer attribute information, and comment output means that outputs, together with the predetermined scene included in the video, a comment based on the comment information item selected by the comment information selection means. Accordingly, a comment that can easily arouse viewer's interest and attention to a game video can be outputted.

A video distribution method according to the present disclosure includes an attribute information acquisition step in which attribute information acquisition means acquires viewer attribute information which indicates an attribute of a viewer who has made access to a video distribution apparatus, a comment information selection step in which comment information selection means selects at least one of a plurality of comment information items associated with a predetermined scene included in the video, on the basis of the viewer attribute information, and a comment output step in which comment output means outputs, together with the predetermined scene included in the video, a comment that is based on the comment information selected by the comment information selection means. Accordingly, a comment that can easily arouse viewer's interest and attention to a game video can be outputted.

A video distribution program according to the present disclosure is a video distribution program for causing a computer to function as a video distribution apparatus that distributes a video to a viewer, the program being configured to cause the computer to function as attribute information acquisition means that acquires viewer attribute information which indicates an attribute of a viewer who has made access to the computer, comment information selection means that selects at least one of a plurality of comment information items associated with a predetermined scene included in the video, on the basis of the viewer attribute information, and comment output means that outputs, together with the predetermined scene included in the video, a comment that is based on the comment information selected by the comment information selection means. Accordingly, a comment that can easily arouse viewer's interest and attention to a game video can be outputted through a computer.

BRIEF DESCRIPTION OF DRAWINGS

FIG. 5 is a diagram indicating examples of attribute information that is acquired by an attribute information acquisition section.

FIG. 6 is a diagram indicating examples of common attribute information that is specified by a common attribute information acquisition section.

FIG. 7 is a diagram indicating examples of a plurality of comment information items that are acquired by a comment information acquisition section.

FIG. 8 is a diagram indicating examples of determination condition information which indicates a condition for determining a degree of interest.

FIG. 9 is a diagram indicating examples of determination results obtained by an interest degree determination section.

DESCRIPTION OF EMBODIMENTS

Hereinafter, an embodiment of the present disclosure will be explained with reference to the drawings. A video distribution apparatus according to the present embodiment outputs a comment that matches an event of a game, together with a game video (hereinafter, simply referred to as a video). In particular, the video distribution apparatus according to the present embodiment is intended to output a comment that can easily arouse viewer's interest and attention to a video, in a manner explained below. In addition, the video distribution apparatus is intended to output a comment that can easily attract viewer's interest and attention not only to a video but also to a distributor of the video.

1. System Configuration

Figure 1:
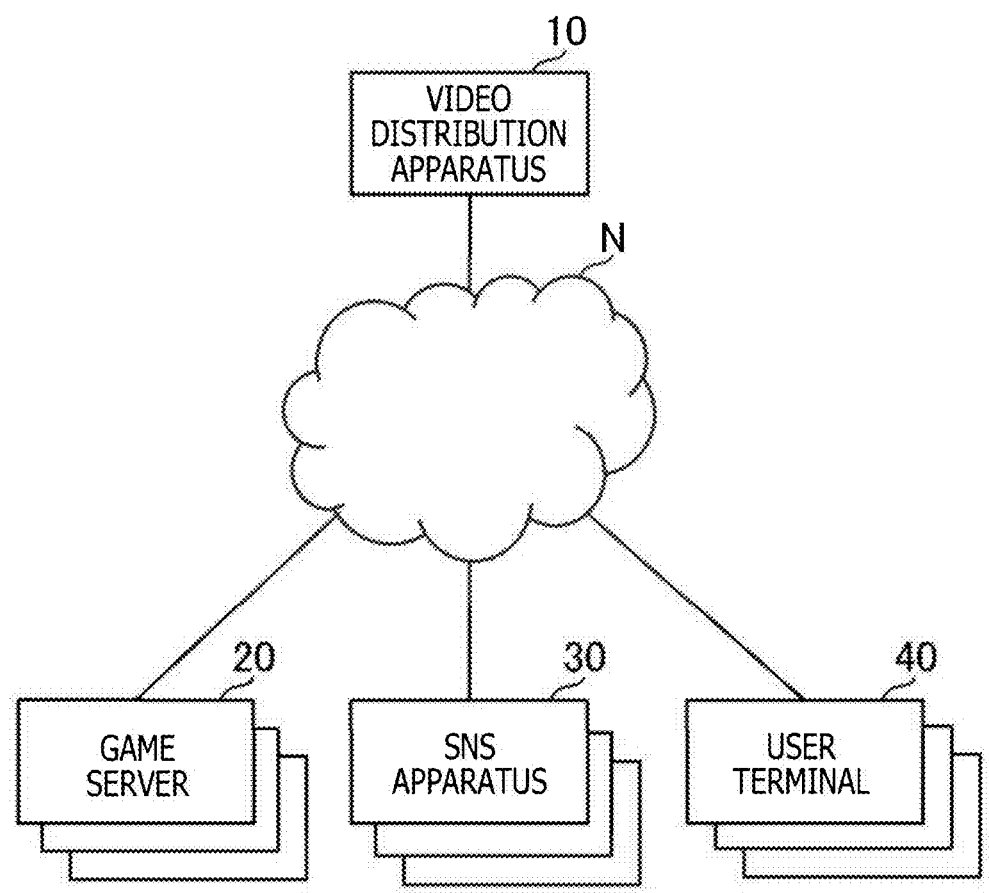
FIG. 1 is a diagram depicting a system configuration including a video distribution apparatus which is one example of an embodiment of the present disclosure.

FIG. 1 is a diagram depicting a system configuration including a video distribution apparatus 10 which is one example of an embodiment of the present disclosure. As depicted in FIG. 1, the video distribution apparatus 10 is connected to a network N such as the Internet in such a manner as to be able to exchange data with a game server 20, a social networking service (SNS) apparatus 30, and a user terminal 40 over the network N. A plurality of the game servers 20 are connected to the network N because there are the game servers 20 for respective game types. In addition, a plurality of the SNS apparatuses 30 are connected to the network N because there are the SNS apparatuses 30 for respective service/community types.

Further, a plurality of the user terminals 40 are connected to the network N. Respective users using the user terminals 40 can view a video transmitted (distributed) from the video distribution apparatus 10 to the user terminals 40.

Figure 2A:
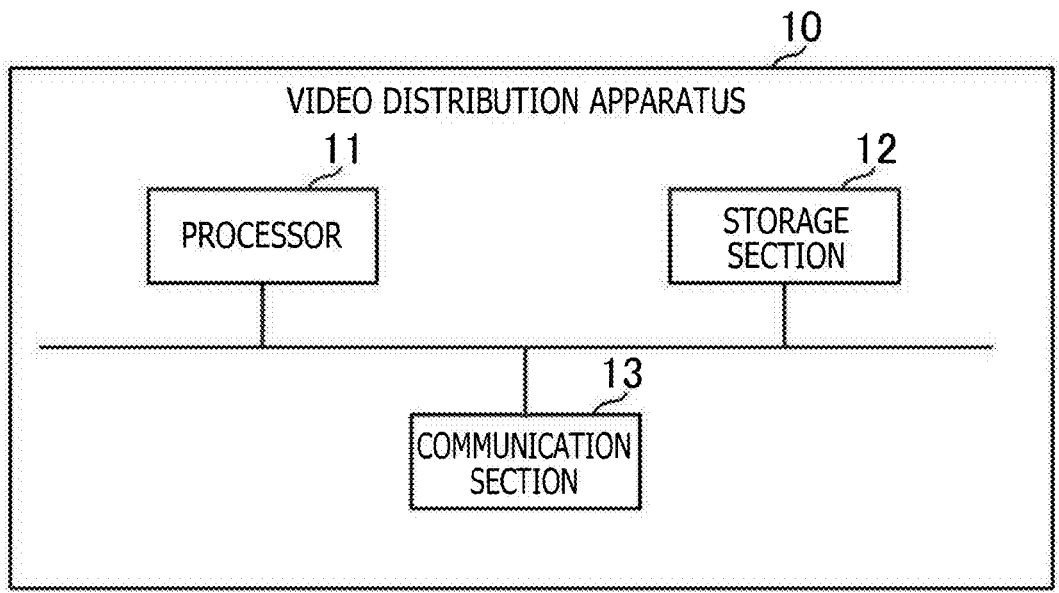
FIG. 2A is a diagram depicting one example of a hardware configuration of the video distribution apparatus.

FIG. 2A is a diagram depicting one example of a hardware configuration of the video distribution apparatus 10. The video distribution apparatus 10 is a computer such as a server apparatus and includes a processor 11, a storage section 12, and a communication section 13 as depicted in FIG. 2A. For example, the processor 11 is a program control device such as a central processing unit (CPU) that works in accordance with a program installed in the video distribution apparatus 10 which is a computer. The storage section 12 is a hard disk drive or a storage element such as a read only memory (ROM) or a random access memory (RAM). Data on the program to be executed by the processor 11, etc. is stored in the storage section 12. For example, the communication section 13 is a communication interface such as a network board.

Figure 2B:
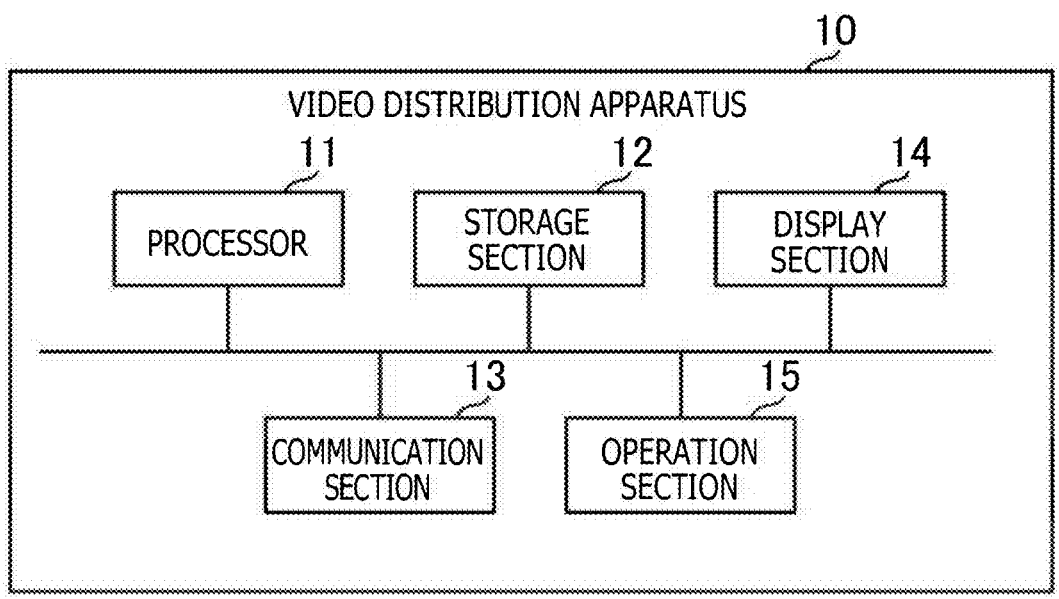
FIG. 2B is a diagram depicting another example of a hardware configuration of the video distribution apparatus.

FIG. 2B is a diagram depicting another example of a hardware configuration of the video distribution apparatus 10. The video distribution apparatus 10 may be a game apparatus such as a PlayStation (registered trademark) or a portable information terminal such as a personal computer, a smartphone, or a tablet terminal. In this case, the video distribution apparatus 10 may further include a display section 14 and an operation section 15 as depicted in FIG. 2B. The display section 14 is a display device such as a liquid crystal display and displays a variety of images according to an instruction provided from the processor 11. The operation section 15 is a user interface such as a keyboard, a mouse, or a game controller. The operation section 15 receives a user operation input and outputs to the processor 11 a signal indicating contents of the operation input. It is to be noted that the video distribution apparatus 10 may include a universal serial bus (USB) port and an optical disk drive for reading optical disks.

The game server 20 is a computer such as a server apparatus. The game server 20 may include a processor, a storage section, and a communication section. The game server 20 is for providing a game to a user. The game server 20 executes processing of a game being played by a user of the user terminal 40. The user terminal 40 communicates with the game server 20, so that the user can play the game provided by the game server 20 through the user terminal 40. The game server 20 may generate a video of a recorded game play and store the video into a game database 210 (see FIG. 3) of the game server 20. In addition, the game server 20 may store attribute information which indicates an attribute of the user having played the game, into the game database 210. The game database 210 may be implemented by a storage section of the game server 20 or a storage connected with the game server 20.

The SNS apparatus 30 is a computer such as a server apparatus and may include a processor, a storage section, or a communication section. The SNS apparatus 30 provides a service to promote communication among a plurality of users and provides a function of showing comments and blog posts and an electronic bulletin board function. The SNS apparatus 30 manages posted information which indicates a post given by a user, and information which indicates an attribute of the user. The SNS apparatus 30 may store attribute information which indicates the attribute of a user into an SNS database 310 (see FIG. 3). The SNS database 310 may be implemented by a storage section of the SNS apparatus 30 or a storage connected with the SNS apparatus 30.

The user terminal 40 connected to the network N is a computer such as a game apparatus, a personal computer, or a mobile information terminal. The user terminal 40 may include a processor, a storage section, a communication section, a display section, and an operation section. The user terminal 40 may include a sound output section such as a loudspeaker. A viewer who is the user of the user terminal 40 can view a video distributed from the video distribution apparatus 10, by using the display section of the user terminal 40 or a display connected with the user terminal 40.

2. Functional Blocks

Figure 3:
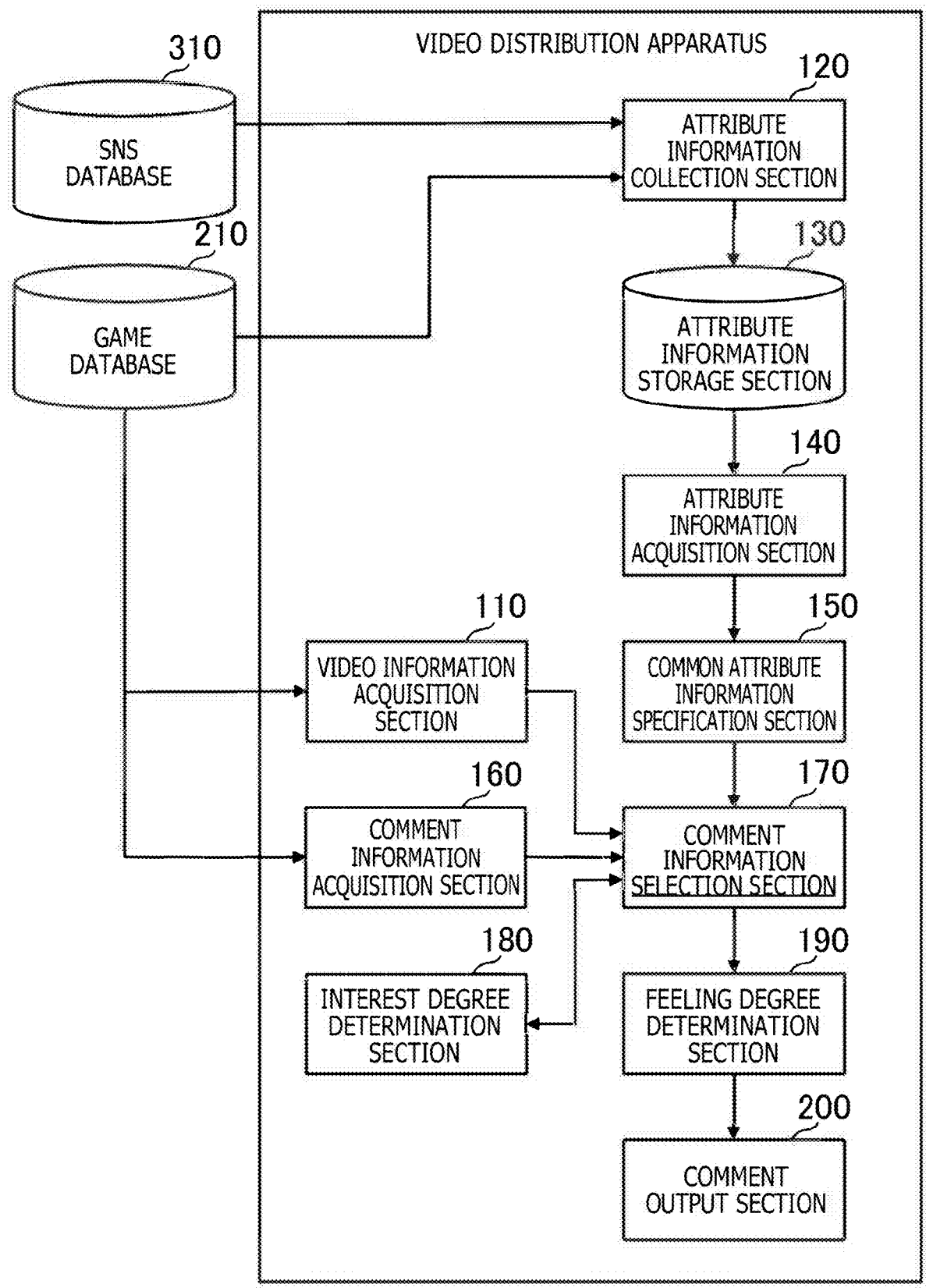
FIG. 3 is a functional block diagram depicting examples of functions that are installed in the video distribution apparatus.

FIG. 3 is a functional block diagram depicting examples of functions that are installed in the video distribution apparatus 10. As depicted in FIG. 3, the video distribution apparatus 10 functionally includes a video information acquisition section 110, an attribute information collection section 120, an attribute information storage section 130, an attribute information acquisition section 140, a common attribute information specification section 150, a comment information acquisition section 160, a comment information selection section 170, an interest degree determination section 180, a feeling degree determination section 190, and a comment output section 200. The video information acquisition section 110, the attribute information collection section 120, the attribute information acquisition section 140, the common attribute information specification section 150, the comment information acquisition section 160, the comment information selection section 170, the interest degree determination section 180, the feeling degree determination section 190, and the comment output section 200 may be implemented mainly by the processor 11. The attribute information storage section 130 may be mainly implemented by the storage section 12. Alternatively, the attribute information storage section 130 may be implemented by a storage that is wirelessly or wiredly connected to the video distribution apparatus 10. It is to be noted that all the functions depicted in FIG. 3 do not need to be installed in the video distribution apparatus 10, and functions other than those depicted in FIG. 3 may be installed.

2-1. Video Information Acquisition Section

The video information acquisition section 110 acquires a video (video data) and related information which is related to the video. The video includes images, sounds, and information regarding a video reproduction time from the start to the end of the video. In the related information, identification information for identifying a specific scene of the video is associated with a video reproduction time. In the present embodiment, a video is obtained by recording a game play performed by a distributor, and related information includes, as identification information for identifying a predetermined scene of a video, event information that indicates a predetermined event having occurred during the game play performed by a distributor.

For example, a video and related information are generated from a game play performed by a distributor who operates the operation section 15 of the video distribution apparatus 10 or the operation section of the user terminal 40, and are stored (saved) into the game database 210 of the game server 20. In this case, the video information acquisition section 110 may acquire a video and its related information stored in the game database 210. In addition, in a case where the video distribution apparatus 10 is a game apparatus, a personal computer, or a mobile information terminal, and a video and related information are stored in the storage section 12 of the video distribution apparatus 10, the video information acquisition section 110 may acquire the video and the related information stored in the storage section 12 of the video distribution apparatus 10.

Figure 4:
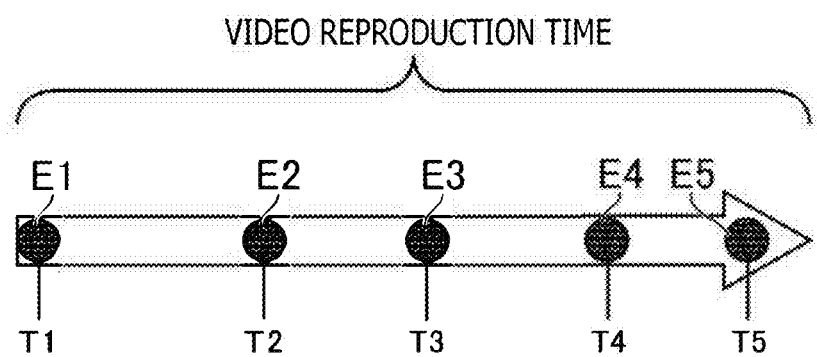
FIG. 4 is a diagram indicating one example of related information that is related to a video.

FIG. 4 is a diagram indicating one example of related information. As indicated in FIG. 4, the related information includes, as identification information for identifying each of scenes of a video, a plurality of event information items E1 to E5. The event information items E1 to E5 are associated with video reproduction times T1 to T5, respectively.

In the following explanation, it is assumed that a video is obtained by recording a distributor's play of a first-person shooter (FPS) game titled "FPS game X", and the events E1 to E5 are the start of a match, a scene where a character being operated by the distributor is struck down many times, a scene where the character being operated by the distributor is rummaging for an item, a scene where the character being operated by the distributor is successfully making a headshot at an opponent character, and a scene where a team to which the distributor belongs wins.

2-2. Attribute Information Collection Section and Attribute Information Storage Section The attribute information collection section 120 collects attribute information regarding users from various devices that are connected over the network N. The attribute information storage section 130 stores the attribute information collected by the attribute information collection section 120. The attribute information collection section 120 collects attribute information stored in the game databases 210 of the game servers 20 which are connected to the network N, and attribute information stored in the SNS databases 310 of the SNS apparatuses 30 which are connected to the network N.

2-3. Attribute Information Acquisition Section

The attribute information acquisition section 140 acquires viewer attribute information which is attribute information indicating an attribute of a predetermined viewer who is a video viewing user. The attribute information acquisition section 140 acquires viewer attribute information which indicates an attribute of a viewer who has made access to the video distribution apparatus 10, for example. In addition, in the present embodiment, the attribute information acquisition section 140 additionally acquires distributor attribute information which is attribute information indicating an attribute of a distributor who distributes the video. The attribute information acquisition section 140 acquires attribute information regarding the viewer and the distributor stored in the attribute information storage section 130.

FIG. 5 is a diagram indicating examples of attribute information that is acquired by the attribute information acquisition section 140. Hereinafter, it is assumed that "user A" in FIG. 5 is a distributor of a video while "user B", "user C", and "user D" are viewers of the video. It is to be noted that the video distribution apparatus 10 is intended to output a unique comment to each of the user B, the user C, and the user D who are the viewers of the video, as explained below.

The attribute information acquisition section 140 acquires, as viewer attribute information or distributor attribute information, attribute information (attribute information collected from the game database 210) that indicates trends in game plays or results of game plays, for example. In the examples in FIG. 5, attribute information indicating that the game level (LV) is 22 in "FPS game X" played by the user A, the play time is 18 hours, and the today's total number of times of plays is 10, attribute information indicating that the rank is 700 in "puzzle game Y" played by the user A and the play time is 900 hours, and attribute information indicating that the number of cleared matches is 600 in "fighting game Z" and the play time is 400 hours are acquired as distributor attribute information regarding the user A who is the distributor.

In addition, in the examples in FIG. 5, the attribute information acquisition section 140 acquires, as viewer attribute information regarding the user B who is a viewer of the video, attribute information indicating that the game level is 10 in "FPS game X" played by the user B, the play time is eight hours, and the today's total number of times of plays is one. Further, attribute information indicating that the rank is 60 in "puzzle game Y" played by the user C and the play time is 48 is acquired as viewer attribute information regarding the user C who is a viewer. In addition, attribute information indicating that the number of cleared matches is three in "fighting game Z" played by the user D and the play time is five hours is acquired as viewer attribute information regarding the user D who is a viewer.

In addition, the attribute information acquisition section 140 acquires attribute information (attribute information collected from the SNS database 310) that is related to situations, actions, and interests predicted from posts on an SNS service. In the examples in FIG. 5, attribute information indicating that the address of the user A is S prefecture, attribute information indicating that the number of reactions to a professional baseball team H (the number of positive reactions that the user A has made to posted information regarding the professional baseball team H) is 22, attribute information indicating that the number of reactions to a professional baseball player I is one, attribute information indicating that the number of reactions to an idol R is 24, attribute information indicating that the number of reactions to a professional gamer S is five, and attribute information indicating that the user A visited O prefecture last week are acquired as distributor attribute information regarding the user A.

In addition, in the examples in FIG. 5, the attribute information acquisition section 140 acquires, as viewer attribute information regarding the user B, attribute information indicating that the address of the user B is S prefecture, attribute information indicating that the number of reactions to the professional baseball team H is 19, and attribute information indicating that the number of reactions to the professional baseball player I is six. In addition, attribute information indicating that the address of the user C is T prefecture, attribute information indicating that the number of reactions to a professional baseball team L is eight, and attribute information indicating that the number of reactions to the professional gamer S is 10 are acquired as viewer attribute information regarding the user C. In addition, attribute information indicating that the address of the user D is T prefecture, attribute information indicating that the number of reactions to the idol R is 120, and attribute information indicating that the user D visited O prefecture last week (the place that the user A also visited last week) are acquired as viewer attribute information regarding the user D.

2-4. Common Attribute Information Specification Section

The common attribute information specification section 150 determines that, among the viewer attribute information items acquired by the attribute information acquisition section 140, viewer attribute information that is common to the distributor attribute information indicating the attributes of the video distributor is common attribute information.

FIG. 6 is a diagram indicating examples of common attribute information that is specified by the common attribute information specification section 150. As indicated in FIG. 6, the common attribute information specification section 150 specifies, as common attribute information, the user B's attribute information related to the "FPS game X". This is because the user B's viewer attribute information includes the attribute information related to the "FPS game X" and the user A's distributor attribute information also includes the attribute information related to the "FPS game X" as indicated in FIG. 5. Thus, the game titles are identical to each other. Also, the common attribute information specification section 150 specifies, as common attribute information, the attribute information indicating that the address of the user B is S prefecture (the user A also lives in the same S prefecture), the attribute information indicating the number of reactions to the professional baseball team H (the team name of this baseball team is identical to that of the professional baseball team to which the user A has made positive reactions), and the attribute information indicating the number of reactions to the professional baseball player I (the name of this professional baseball player is identical to that of the professional baseball player followed by the user A).

In addition, in the examples in FIG. 6, the common attribute information specification section 150 specifies, as common attribute information, the user C's attribute information related to the "puzzle game Y" (the title of this game is identical to that of the game played by the user A) and the attribute information indicating the number of reactions to the professional gamer S (the name of this professional gamer is identical to that of the professional gamer to which the user A has made positive reactions). Also, the user C's attribute information related to the "professional baseball team L" may be specified as common attribute information because the professional baseball team L and the "professional baseball team H" to which the user A has made positive reactions are both professional baseball teams. However, the user C's attribute information indicating T prefecture has no point in common with the user A's distributor attribute information, and hence, is not specified as common attribute information.

In addition, in the examples in FIG. 6, the common attribute information specification section 150 specifies, as common attribute information, the user D's attribute information related to the "fighting game Z" (the title of this game is identical to that of the game played by the user A), the attribute information indicating the number of reactions to the idol R (the name of this idol is identical to that of the idol to whom the user A has made positive reactions), and the attribute information indicating that the destination of the last week's visit is O prefecture.

It is to be noted that, in a case where a plurality of viewers have attribute information indicating living in O prefecture, the common attribute information specification section 150 may specify this attribute information as common attribute information because the user A's distributor attribute information also indicates that O prefecture is the destination of the last week's visit made by the user A. In this case, the common attribute information specification section 150 may add, to the specified common attribute information, information indicating that O prefecture is the destination of the last week's visit made by the user A.

2-5. Comment Information Acquisition Section

The comment information acquisition section 160 acquires a plurality of comment information items associated with a predetermined scene included in the video. Each of the plurality of comment information items acquired by the comment information acquisition section 160 indicates a comment candidate that the comment output section 200 to be described later outputs together with the predetermined scene included in the video. The comment information acquisition section 160 may acquire game-related comment information from the game database 210 of the game server 20 connected over the network N. In addition, the comment information acquisition section 160 may acquire comment information stored in the storage section 12 of the video distribution apparatus 10 or any other storage.

FIG. 7 is a diagram indicating examples of a plurality of comment information items that are acquired by the comment information acquisition section 160. As indicated in FIG. 7, the comment information includes a fixed phrase. For example, in the comment information: "This is the today's N-th play. You're absorbed in this game.", a character string excluding [N] is a fixed phrase. In addition, in the comment information: "This game is completely different from [puzzle game]. Can you really play?", a character string excluding [puzzle game] is a fixed phrase.

In addition, as indicated in FIG. 7, the comment information is associated with any of event information items E1 to E5 (see FIG. 4) that each indicate a predetermined event during the game. In other words, the event information items E1 to E5 are associated with a plurality of comment information items.

In the examples in FIG. 7, the event information item E1 which indicates the start of a match in the game is associated with comment information: "This is the today's [N]-th play. You're absorbed in this game.", "This game is completely different from [puzzle game]. Can you really play?", and "You have experienced hand-to-hand battles in [fighting game]. Demonstrate your skills!" In addition, the event information item E2 which indicates a scene where the character being operated by the distributor is struck down many times is associated with comment information: "Don't you get tired? You don't know when to give up.", "It doesn't go like [puzzle game].", "[Professional gamer] you admire is out of your league.", and "Are you still on vacation mode in [prefecture]?" Moreover, the event information item E3 which indicates a scene where the character being operated by the distributor is looking for items is associated with comment information: "Fans of [professional baseball team] do whatever it takes to get items.", "You are miserably desperate. You will rummage through garbage in order to become [professional gamer].", and "You are hungrily hunting as if you were looking for souvenirs from [prefecture]." In addition, the event information item E4 which indicates a scene where the character being operated by the distributor is successfully making a headshot at an opponent character is associated with comment information: "It's gone! Great home run!", "Great knockout!", "Perfect! You got one step closer to [professional gamer]!?", and "Headshot dedicated to [idol]!" In addition, the event information item E5 which indicates a scene where the team to which the distributor belongs wins is associated with comment information: "[N]-th time lucky. You finally won. It is good.", "Anything in common with [puzzle game]? Anyway, it is nice you win.", and "You win. [Idol] is smiling."

2-6. Comment Information Selection Section and Interest Degree Determination Section The comment information selection section 170 selects at least one of a plurality of comment information items acquired by the comment information acquisition section 160, on the basis of the viewer attribute information acquired by the attribute information acquisition section 140. That is, the comment information selection section 170 selects at least one of a plurality of comment information items associated with a predetermined scene included in the video, on the basis of viewer attribute information which indicates an attribute of a viewer of the video. In the present embodiment, the comment information selection section 170 selects at least one of a plurality of comment information items on the basis of the viewer attribute information specified as common attribute information by the common attribute information specification section 150.

The comment information selection section 170 selects at least one of a plurality of comment information items (see FIG. 7) associated with each of the plurality of event information items E1 to E5 (see FIG. 4), on the basis of the common attribute information regarding the respective viewers. The comment information selection section 170 selects the comment information: "This is the today's N-th play. You're absorbed in this game." from among a plurality of comment information items (see FIG. 7) associated with the event information item E1, on the basis of the attribute information related to the "EPS game X", among the common attribute information (see FIG. 9) of the user B who is a viewer, and selects the comment information: "Don't you get tired? You don't know when to give up." from among a plurality of comment information items associated with the event information item E2, and selects the comment information: "[N]-th time lucky. You finally won. It is good." related to the FPS game from among a plurality of comment information items associated with the event information item E5.

From the user B's attribute information related to the "FPS game X", it is deduced that the user B has an experience of playing the FPS game X. Therefore, the comment information related to the FPS game X which is the game played by the distributor in the video is selected. Accordingly, the comment output section 200 to be described later can output a comment that can easily arouse the user B's interest and attention.

In addition, regarding the user B, the comment information selection section 170 selects the comment information: "Fans of [professional baseball team] do whatever it takes to get items." from among a plurality of comment information items associated with the event information item E3, and selects the comment information: "It's gone! Great home run!" from among a plurality of comment information items associated with the event information item E4, on the basis of the user B's attribute information that indicates the number of reactions to the "professional baseball team H." It is deduced that the user B likes baseball, on the basis of the user B's attribute information that indicates the number of reactions to the "professional baseball team H." Therefore, comment information related to the professional baseball team is selected. Accordingly, a comment that can easily arouse the user B's interest and attention can be outputted.

Regarding the user C, the comment information selection section 170 selects the comment information: "This game is completely different from [puzzle game]. Can you really play?" from among a plurality of comment information items associated with the event information item E1, selects the comment information: "It doesn't go like [puzzle game]." from among a plurality of comment information items associated with the event information item E2, and selects the comment information: "Anything in common with [puzzle game]? Anyway, it is nice you win." from among a plurality of comment information items associated with the event information item E5, on the basis of the user C's attribute information that is related to the "puzzle game Y". In addition, the comment information selection section 170 selects the comment information: "You are miserably desperate. You will rummage through garbage in order to become [professional gamer]" from among a plurality of comment information items associated with the event information item E3, and selects the comment information: "Perfect! You got one step closer to [professional gamer]!?" from among a plurality of comment information items associated with the event information item E4, on the basis of the user C's attribute information that is related to the number of reactions to the "professional gamer S". It is deduced that the user C has played the puzzle game Y and is interested in the professional gamer S, on the basis of the user C's attribute information that is related to the "puzzle game Y" and the user C's attribute information that is related to the number of reactions to the "professional gamer S". Therefore, comment information related to the puzzle game Y and comment information related to the professional gamer S are selected. Accordingly, a comment that can easily arouse the user C's interest and attention can be outputted.

Regarding the user D, the comment information selection section 170 selects the comment information: "You have experienced hand-to-hand battles in [fighting game]. Demonstrate your skills!" from among a plurality of comment information items associated with the event information item E1, on the basis of the user D's attribute information that is related to the "fighting game Z". On the basis of the attribute information indicating that the user D visited O prefecture last week and the attribute information indicating that the user A visited O prefecture last week, the comment information selection section 170 selects the comment information: "Are you still on vacation mode in [prefecture]?" from among a plurality of comment information items associated with the event information item E2, and selects the comment information: "You are hungrily hunting as if you were looking for souvenirs from [prefecture]" from among a plurality of comment information items associated with the event information item E3. In addition, on the basis of the user D's attribute information indicating the number of reactions to the "idol R", the comment information selection section 170 selects the comment information: "Headshot dedicated to [idol]!" from among a plurality of comment information items associated with the event information item E4, and selects the comment information: "You win. [Idol] is smiling." from among a plurality of comment information items associated with the event information item E5. It is deduced that the user D has played the fighting game Z, is interested in the idol R, and visited O prefecture last week, on the basis of the user D's attribute information. Therefore, comment information related to the fighting game Z, comment information related to the idol R, and comment information related to O prefecture which is the destination of the visit are selected. Accordingly, a comment that can easily arouse the user D's interest and attention can be outputted.

The comment information selection section 170 may determine at least one of a plurality of viewer attribute information items corresponding to a plurality of comment information items associated with a predetermined scene included in the video, on the basis of a plurality of degrees of interest determined for the respective viewer attribute information items, and select comment information that corresponds to the determined viewer attribute information item. In this case, the interest degree determination section 180 determines the viewer's degree of interest in the attribute indicated by the viewer attribute information item. In the present embodiment, the interest degree determination section 180 determines the viewer's degree of interest and the distributor's degree of interest in the attribute indicated by the viewer attribute information specified as common attribute information by the common attribute information specification section 150. Further, the comment information selection section 170 determines at least one of a plurality of viewer attribute information items corresponding to a plurality of comment information items associated with a predetermined scene included in the video, on the basis of the viewer's degrees of interest and the distributor's degrees of interest determined for the respective viewer attribute information items, and selects comment information that corresponds to the determined viewer attribute information item.

FIG. 8 is a diagram indicating examples of determination condition information which indicates a condition for determining a degree of interest. In the examples in FIG. 8, the degree of interest is classified into "high", "medium", and "low" levels. For example, in an FPS game, the game level of 20 or higher, the game level of five or higher, and the game level of lower than five are classified as "high", "medium", and "low", respectively. The degree of interest may be classified into multiple stages other than three. Alternatively, a numerical value such as a score may be used as the degree of interest.

Regarding viewer attribute information of the users B to D who are viewers (e.g., common attribute information indicated in FIG. 6), the interest degree determination section 180 determines the users' degrees of interest and the distributor user A's degree of interest in the attribute indicated by the attribute information, on the basis of the determination condition information indicated in FIG. 8, for example. The interest degree determination section 180 may acquire the determination condition information from the storage section 12, the game database 210, or the SNS database 310, or may generate the determination condition information on the basis of information stored in this storage and these databases.

FIG. 9 is a diagram indicating examples of determination results obtained by the interest degree determination section 180. In the examples in FIG. 9, the general degree of interest is determined on the basis of the degrees of interest of the users B to D who are viewers and the degree of interest of the user A who is the distributor. The interest degree determination section 180 may determine the general degree of interest by giving respective predetermined weights to the degrees of interest of the viewers and the distributor (by multiplying a numerical value that indicates the degree of interest with a predetermined coefficient).

In the examples in FIG. 5, the game level indicated by the user B's attribute information related to the FPS game X is 10, and the game level indicated by the distributor user A's attribute information related to the FPS game X is 18. Therefore, the degree of interest of the user B and the degree of interest of the user A in the FPS game X are each determined to be "medium" on the basis of the determination condition information indicated in FIG. 8. Accordingly, the general degree of interest of the users B and A in the FPS game X is also determined to be "medium" as indicated in FIG. 9. In addition, both the user B's degree of interest and the user A's degree of interest in the professional baseball team H are determined to be "high" on the basis of the numbers of reactions made by the respective users. Accordingly, the general degree of interest of the users B and A in the professional baseball team H is also determined to be "high". In addition, the user B's degree of interest in the professional baseball player I is "medium", while the user A's degree of interest in the professional baseball player I is "low". In this case, the interest degree determination section 180 may determine that the general degree of interest of the users B and A in the professional baseball player I is "low".

It is determined that both the user C's degree of interest and the user A's degree of interest in the puzzle game Y are "high" on the basis of the play times indicated by the user C's and user A's attribute information related to the puzzle game Y in FIG. 5. Thus, it is determined that the general degree of interest in the puzzle game Y is also "high" as indicated in FIG. 9.

Also, the user C's and user A's degrees of interest in the professional gamer S are each determined to be "medium". Regarding the professional baseball team L, it is determined that the user C's degree of interest in the professional baseball team L is determined to be "medium", while the user A's attribute information includes the attribute information related to the professional baseball team H but does not include attribute information related to the professional baseball team L. In this case, the interest degree determination section 180 may determine that the general degree of interest of the users B and A in the professional baseball player I is "low".

In addition, the general degree of interest of the users D and A in the fighting game Z is determined to be "low", and the general degree of interest in the idol R is determined to be "high", as indicated in the examples in FIG. 9. It is to be noted that the interest degree determination condition regarding the address and the destination of a last week's visit of each user is not included in the determination condition information in FIG. 8. Hence, respective predetermined values ("medium" in the examples in FIG. 9) may be set for the degrees of interest regarding the address and the destination of a last week's visit.

On the basis of the general degree of interest determined by the interest degree determination section 180 as described above, the comment information selection section 170 may decide on at least one of a plurality of viewer attribute information items corresponding to a plurality of comment information items associated with a predetermined scene included in the video. In the examples in FIG. 7, a plurality of comment information items associated with the scene of the event information item E2 correspond to an FPS game, a puzzle game, a professional gamer, and a visit destination. In the plurality of user C's attribute information items, the general degree of interest in the "puzzle game Y" is the highest, which is higher than "medium" as the general degree of interest in the "professional gamer S", for example, as indicated in FIG. 9. Therefore, the comment information selection section 170 decides on the attribute information related to the puzzle game Y as the user C's attribute information corresponding to the scene of E2. Then, comment information that corresponds to the determined attribute information is selected. That is, from among a plurality of comment information items associated with the event information item E2, not the comment information: "[professional gamer] you admire is out of your league." which is related to a professional gamer, but the comment information: "It doesn't go like [puzzle game]." which is related to a puzzle game is selected on the basis of the user C's attribute information. In this manner, comment information is acquired on the basis of the attribute information related to the puzzle game Y in which the degree of interest is the highest among the user C's attribute information items. Accordingly, a comment that can more effectively arouse the user C's interest or attention can be outputted by the comment output section 200 to be described later.

2-7. Feeling Degree Determination Section and Comment Output Section

The comment output section 200 outputs a comment that is based on the comment information selected on the basis of the viewer attribute information by the comment information selection section 170, together with a predetermined scene included in the video, to the user terminal 40 of the viewer.

The comment output section 200 outputs the comment together with the predetermined scene included in the video, by displaying, for example, a text such as captions indicating contents of the comment on the display section of the user terminal 40. The text may be displayed outside a display region where the video is displayed or may be displayed to be superimposed on the video. In a case where the user terminal 40 includes a sound output section such as a loudspeaker, the comment output section 200 may convert the comment into a sound by predetermined processing such as Text to speech, and output the sound through the sound output section (e.g., a loudspeaker) of the user terminal 40.

Comment information includes a fixed phrase. The comment output section 200 generates a comment that includes a fixed phrase included in comment information and a word concerning an attribute indicated by viewer attribute information, and outputs the generated comment to the user terminal 40. The comment output section 200 may add a word included in the viewer attribute information or the distributor attribute information, to the comment. In addition, in order to confirm contents of the generated comment with the distributor, the comment output section 200 may output the generated comment to the user terminal 40 of the distributor, or display the generated comment on the display section 14 of the video distribution apparatus 10, for example.

Figure 10:
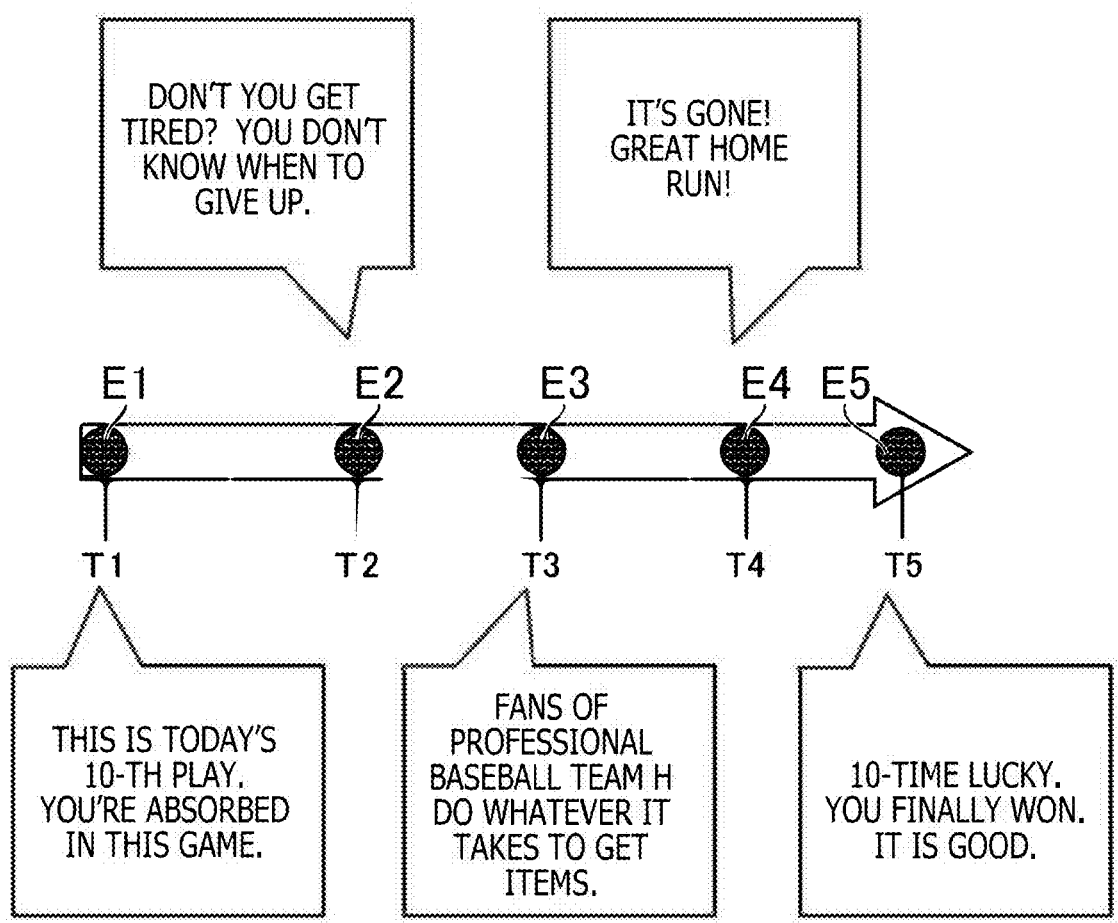
FIG. 10 is a diagram indicating examples of comments that are outputted to a viewer.
Figure 11:
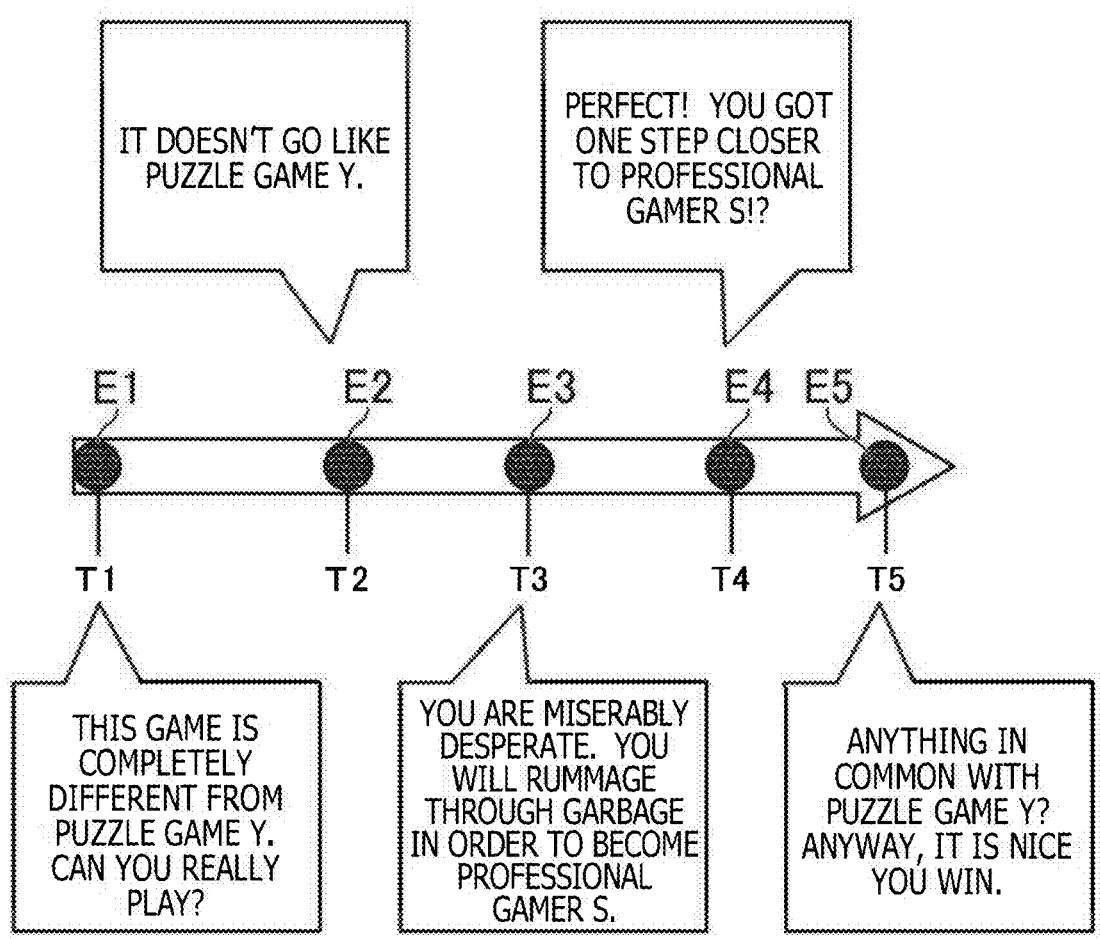
FIG. 11 is a diagram indicating other examples of comments that are outputted to a viewer.
Figure 12:
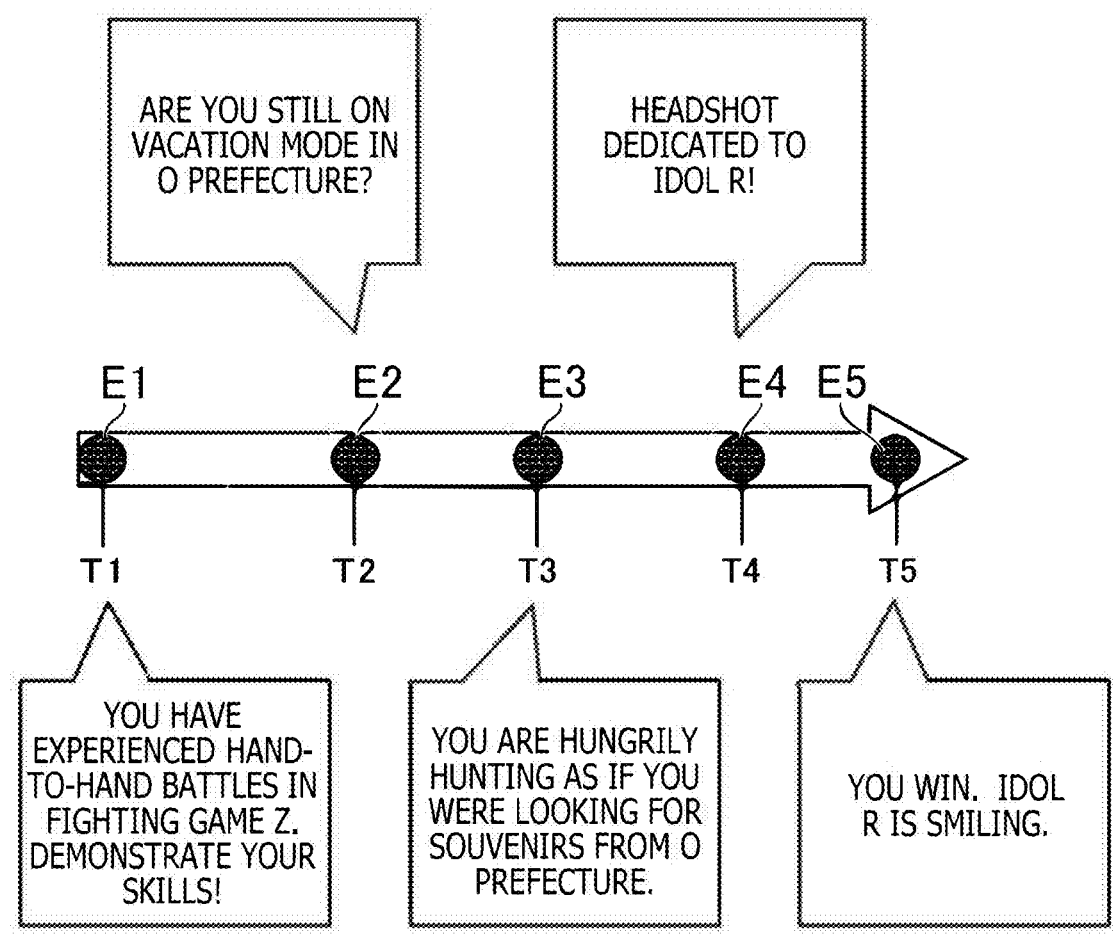
FIG. 12 is a diagram indicating still other examples of comments that are outputted to a viewer.

FIGS. 10 to 12 are diagrams each indicating examples of comments that are outputted to viewers. FIG. 10 indicates comments that are outputted to the user B. As indicated in FIG. 10, the comment output section 200 outputs a comment for the user B to the user terminal 40 being used by the user B. For example, in "This is the today's N-th play. You're absorbed in this game.", [N] is replaced with "10" which is included in the distributor user A's attribute information related to the FPS game X. As a result, a comment: "This is the today's 10-th play. You're absorbed in this game." is generated and is outputted in association with the scene corresponding to the event information item E1. Further, a comment: "Don't you get tired? You don't know when to give up." is outputted in association with the scene corresponding to the event information item E2. Moreover, in "Fans of [professional baseball team] do whatever it takes to get items.", [professional baseball team] is replaced with the professional baseball team H which is an attribute indicated by the user B's attribute information. As a result, a comment: "Fans of the professional baseball team H do whatever it takes to get items." is generated and is outputted in association with the scene corresponding to the event information item E3. Also, a comment: "It's gone! Great home run!" and a comment: "The 10-th time lucky. You finally won. It is good." are generated and are outputted in association with the scenes corresponding to the event information items E4 and E5, respectively.

As a result, on the user terminal 40 reproducing the video, the comments: "This is the today's 10-th play. You're absorbed in this game.", "Don't you get tired? You don't know when to give up.", "Fans of the professional baseball team H do whatever it takes to get items.", "It's gone! Great home run!", and "The 10-th time lucky. You finally won. It is good." are sequentially outputted at the video reproduction times T1 to T5, respectively. Accordingly, a comment that can arouse more interest or attention of the user B, who has experienced the FPS game X which is the subject of the video and who has made a positive reaction to the professional baseball team H, can be outputted.

FIG. 11 indicates comments that are outputted to the user C. FIG. 12 indicates comments that are outputted to the user D. As indicated in FIG. 11, the comment output section 200 also generates a comment obtained by adding a word concerning the attribute (puzzle game Y, professional gamer S) indicated by the user C's attribute information to a fixed phrase included in the comment information, and outputs the generated comment to the user terminal 40 of the user C. As indicated in FIG. 12, the comment output section 200 also generates a comment obtained by adding, for example, a word concerning the attribute (fighting game z, idol R, or O prefecture) indicated by the user D's attribute information to a fixed phrase included in the comment information, and outputs the generated comment to the user terminal 40 of the user D. Accordingly, a comment that can arouse more user C/D's interest or attention can be outputted.

In the present embodiment, comment information is selected on the basis of not only the viewer user B to D's attribute information but also, among the attribute information, common attribute information that has a point in common with the distributor user A's attribute information, and a comment that is based on the comment information is outputted together with a corresponding scene of the video. That is, a comment that is outputted to each of the users B to D is based not only on the corresponding user's viewer attribute information but also on the distributor user A's attribute information.

For this reason, a comment that can easily arouse the interest or attention to both the video and the user A who is the distributor of the video can be outputted.

The comment output section 200 may output a comment that is based on comment information, in a form according to the degree of feeling in the comment information determined by the feeling degree determination section 190. In this case, the feeling degree determination section 190 may determine the degree of feeling in the comment information for the viewer attribute information corresponding to the comment information on the basis of the degree of interest determined by the interest degree determination section 180.

The feeling degree determination section 190 decides to set the degree of feeling in the comment information to be high when it is determined that the degree of interest determined for the viewer attribute information corresponding to the comment information is high, and decides to set the degree of feeling in the comment information to be low when it is determined that the degree of interest is low, for example. For example, the comment information: "It's gone! Great home run!" is selected on the basis of the user B's attribute information related to the baseball team H. Since the degree of interest in the professional baseball team H is determined to be "high" as indicated in FIG. 9, the feeling degree determination section 190 decides to set the degree of feeling in the comment information: "It's gone! Great home run!" to be high.

For example, in a case where a text such as a caption indicating contents of a comment is displayed on the display section of the user terminal 40 to output the comment to a viewer, the comment output section 200 may display the comment (a text such as a caption) based on comment information in which the degree of feeling is decided to be set high, in such a way that the size of the comment is larger than that of the other comments, or in such a way that the font or color of the comment differs from that of the other comments. In addition, the comment output section 200 may display a comment based on comment information in which the degree of feeling is decided to be set low, in such a way that the size of the comment is smaller than that of the other comments, or in such a way that the brightness or chroma of the comment is lower than that of the other comments.

In addition, to convert a comment into a sound by predetermined processing such as Text to speech, the comment output section 200 may set the volume of a comment that is based on comment information in which the degree of feeling is decided to be set high, to be larger than the volume of the other comments, or may output the comment sound more emotionally. In addition, the comment output section 200 may set the volume of a comment that is based on comment information in which the degree of feeling is decided to be set low, to be smaller than the volume of the other comments, or may output the comment sound less emotionally.

In the aforementioned manner, the feeling degree determination section 190 determines the degree of feeling in the comment information on the basis of the degree of interest in the viewer attribute information, and the comment output section 200 outputs the comment in a manner according to the degree of feeling in the comment information. Accordingly, a comment that corresponds to viewer attribute information in which the degree of interest is determined to be high is outputted in an emphasized manner. Consequently, a comment that can more effectively arouse viewer's interest or attention can be outputted.

3. Flowchart

Figure 13:
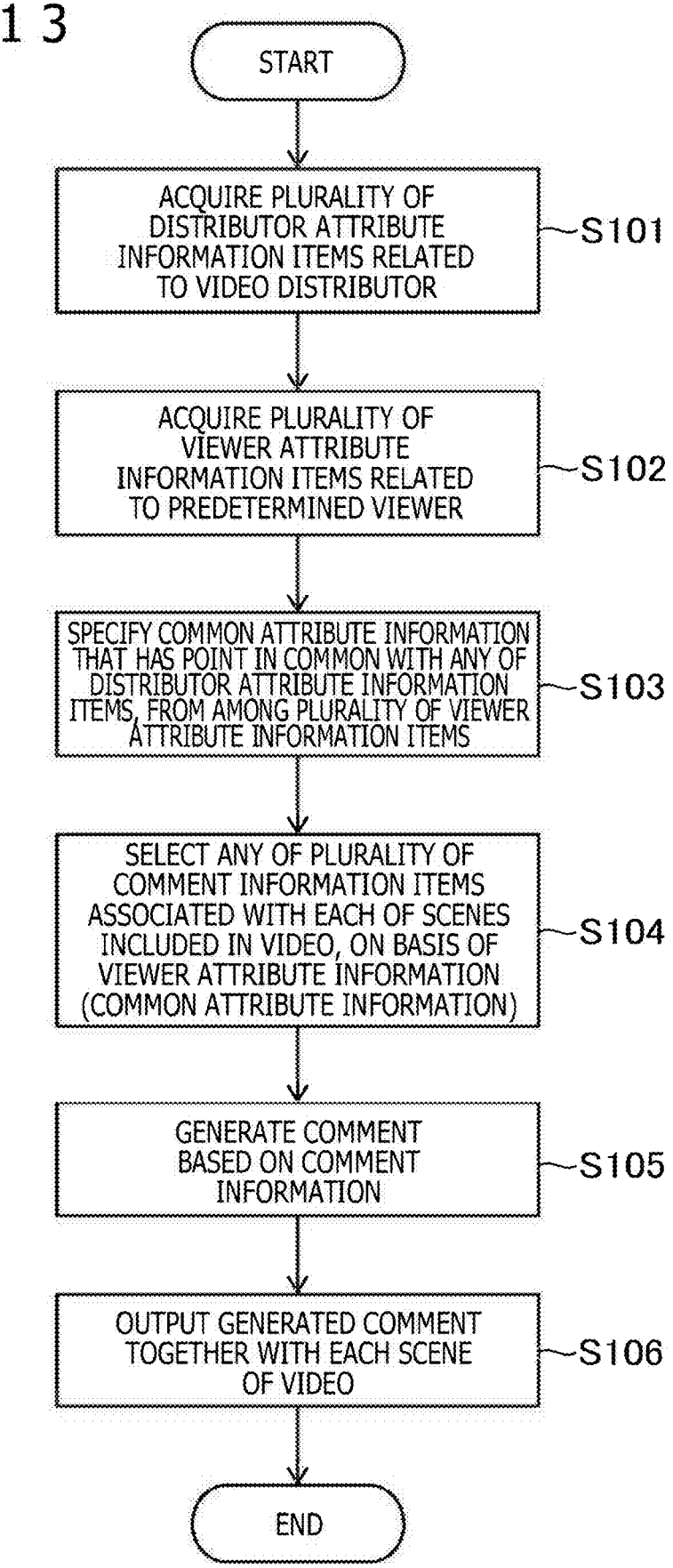
FIG. 13 is a diagram indicating one example of a process flow that is executed in the video distribution apparatus.

FIG. 13 is a diagram indicating one example of a process flow that is executed in the video distribution apparatus 10. When a predetermined viewer (e.g., either user B or C) makes access to the video distribution apparatus 10 through the user terminal 40, the processor 11 of the video distribution apparatus 10 performs steps in FIG. 13. In addition, in a case where a video distributor (e.g., user A) sends an instruction to output a video to the predetermined viewer, the processor 11 of the video distribution apparatus 10 may perform one or more of steps S101 to S105 in FIG. 13, and then, perform the remaining steps if the viewer makes access to the video distribution apparatus 10.

In the example in FIG. 13, first, the attribute information acquisition section 140 acquires a plurality of distributor attribute information items related to the distributor of the video (step S101). The attribute information acquisition section 140 acquires, as distributor attribute information, information regarding an attribute of the distributor included in attribute information items collected from the game database 210, the SNS database 310, and the like by the attribute information collection section 120.

In a case where the user A is the distributor of the video, the attribute information acquisition section 140 acquires user A's attribute information as distributor attribute information at step S101. For example, as indicated in FIG. 5, attribute information items related to the FPS game X, the puzzle game Y, and the fighting game Z that the user A has played, the attribute information item indicating that the address of the user A is S prefecture, the attribute information items related to the professional baseball team H, the professional baseball player I, the idol R, and the professional gamer S to which the user A has made positive reactions, and the attribute information item indicating that the user A visited O prefecture last week are acquired as distributor attribute information.

Next, the attribute information acquisition section 140 acquires a plurality of viewer attribute information items regarding a predetermined viewer (step S102). The attribute information acquisition section 140 acquires, as viewer attribute information, information regarding an attribute of the predetermined viewer from attribute information items collected from the game database 210, the SNS database 310, and the like. It is to be noted that step S102 may be performed prior to step S101.

In a case where the user B is the predetermined viewer, the attribute information acquisition section 140 acquires, as viewer attribute information, the user B's attribute information at step S102. For example, as indicated in FIG. 5, the attribute information item related to the FPS game X played by the user B, the attribute information item indicating that the address of the user B is S prefecture, and the attribute information items related to the professional baseball team H and the professional baseball player I to which the user B has made positive reactions are acquired as viewer attribute information.

Next, the common attribute information specification section 150 specifies, among the plurality of viewer attribute information items acquired at step S102, common attribute information that has a point in common with any of the plurality of distributor attribute information items acquired at step S101 (step S103).

For example, as indicated in FIG. 6, the user B's viewer attribute information items related to the FPS game X, S prefecture which is the address, the professional baseball team H, and the professional baseball player I each have a point in common with the user A's distributor attribute information. For this reason, the common attribute information specification section 150 specifies these user B's viewer attribution information items as common attribute information at step S103.

Next, the comment information selection section 170 selects any of a plurality of comment information items associated with each scene included in the video, on the basis of the viewer attribute information items (common attribute information specified at step S103 in the present embodiment) acquired at step S102 (step S104). The comment information selection section 170 selects any of a plurality of comment information items acquired from the game database 210 by the comment information acquisition section 160, on the basis of the common attribute information.

For example, as indicated in FIG. 7, a plurality of comment information items are associated with the event information items E1 to E5 which indicate predetermined events of the game played by the distributor or predetermined scenes included in the video. At step S104, the comment information selection section 170 selects any of a plurality of comment information items associated with the event information item E1, on the basis of the common attribute information specified at step S103. In addition, any of a plurality of comment information items associated with each of the event information items E2 to E5 is also selected on the basis of the common attribute information specified at step S103.

At step S104, the comment information selection section 170 may determine a plurality of viewer attribute information items corresponding to the plurality of comment information items associated with the event information (any of the event information items E1 to E5), on the basis of the degree of interest determined for the viewer attribute information by the interest degree determination section 180, and select a comment information item that corresponds to the determined viewer attribute information item.

For example, the interest degree determination section 180 determines "high", "medium", or "low" as the degree of interest in FIG. 9 on the basis of the determination condition information indicated in FIG. 8. The interest degree determination section 180 may determine the degree of interest in the viewer attribute information (common attribute information) on the basis of not only information (parameter) such as the game level or the play time indicated by the viewer attribute information but also information such as the level or the play time indicated by the distributor attribute information.

At step S104, the comment information selection section 170 may preferentially select a comment information item that corresponds to the viewer attribute information in which the degree of interest is determined to be high. In the examples in FIG. 9, the comment information selection section 170 preferentially selects a comment information item related to a professional baseball team since it is determined that the degree of interest in the professional baseball team H in the user B's viewer attribute information is "high".

Next, the comment output section 200 generates a comment that is based on the comment information selected at step S104 (step S105). The comment output section 200 generates a comment that includes a fixed phrase included in the comment information and a word concerning an attribute indicated by the viewer attribute information. Thereafter, the comment output section 200 outputs the comment generated at step S105 to the user terminal 40 (step S106). Then, the processing is finished.

In a case where the comment information: "Fans of [professional baseball team] do whatever it takes to get items." is selected at step S104 on the basis of the user B's attribute information related to the professional baseball team H, the comment output section 200 replaces [professional baseball team] included in the comment information with "professional baseball team H" at step S105. As a result, the comment: "Fans of the professional baseball team H do whatever it takes to get items." is generated as indicated in FIG. 10.

At step S105, the comment output section 200 may generate a comment that includes a word indicated by the viewer attribute information or the distributor attribute information. For example, [N] in the comment information: "This is the today's N-th play. You're absorbed in this game." is replaced with "10" which is the number of times of today's plays included in the user A's distributor attribute information indicated in FIG. 5, so that the comment: "This is today's 10-th play. You're absorbed in this game." is generated.

At step S106, the comment output section 200 outputs the comment together with the predetermined scene included in the video, by displaying, for example, a text such as a caption indicating contents of the comment on the display section of the user terminal 40. In addition, at step S106, the comment output section 200 may convert the comment to a sound by predetermined processing such as Text to speech and output the sound through a sound output section of the user terminal 40.

Further, at step S104, the feeling degree determination section 190 may determine the degree of feeling in the comment information on the basis of the degree of interest in the viewer attribute information. The feeling degree determination section 190 decides to set the degree of feeling in the comment information to be high when it is determined that the degree of interest in the viewer attribute information corresponding to the comment information is high, and decides to set the degree of feeling in the comment information to be low when it is determined that the degree of interest is low, for example.

At step S106, the comment output section 200 may output a comment that is based on the comment information, in a form according to the degree of feeling in the comment information determined at step S104. The comment output section 200 may display the comment (a text) based on the comment information for which the degree of feeling is decided to be set to be high, in such a way that the size of the comment is larger than that of the other comments, or in such a way that the font or color of the comment is different from that of the other comments. In addition, the comment output section 200 may set the volume of the comment based on the comment information for which the degree of feeling is decided to be set to be high is larger than the volume of the other comments.

In the examples in FIG. 9, the degree of interest in the professional baseball team H in the user B's viewer attribute information is determined to be "high". Hence, at step S104, the feeling degree determination section 190 determines that the comment information related to a professional baseball team is high. At step S106, the comment output section 200 outputs the comments: "Fans of the professional baseball team H do whatever it takes to get items." and "It's gone!

Great home run!" in FIG. 10 which are based on the comment information related to a professional baseball team, in an emphasized form compared to the other comments. Therefore, a comment for which the degree of interest is determined to be high is outputted in an emphasized form compared to the other comments, so that a comment that can more effectively arouse the viewer's interest and attention to the video can be outputted.

4. Conclusion

As explained so far, the comment information selection section 170 selects at least one of a plurality of comment information items associated with a predetermined scene included in a video, on the basis of viewer attribute information which indicates an attribute of the viewer, and the comment output section 200 outputs a comment that is based on the comment information selected by the comment information selection section 170, together with a predetermined scene included in the video to the user terminal 40, in the present embodiment. Accordingly, a comment that can easily arouse viewer's interest and attention to the video can be outputted.

In addition, in the present embodiment, the comment information selection section 170 selects at least one of a plurality of comment information items associated with a predetermined scene, on the basis of viewer attribute information specified as common attribute information that has a point in common with distributor attribute information which indicates an attribute of the distributor of the video. A comment that can easily arouse viewer's interest and attention to not only the video but also the distributor of the video can be outputted.

In addition, in the present embodiment, comment information includes a fixed phrase, and the comment output section 200 outputs a comment that includes a fixed phrase included in comment information and a word concerning an attribute indicated by viewer attribute information. Accordingly, the word concerning the attribute indicated by the viewer attribute information can be reflected in the comment, and the comment that can more effectively arouse the viewer's interest and attention can be outputted.

In addition, in the present embodiment, the comment information selection section 170 decides on at least one of a plurality of viewer attribute information (common attribute information) items corresponding to a plurality of comment information items associated with a predetermined scene, on the basis of a plurality of degrees of interest determined for the respective viewer attribute information items, and selects comment information corresponding to the determined viewer attribute information item. Accordingly, comment information corresponding to viewer attribute information in which the degree of interest is determined to be high is preferentially selected, so that a comment that can more effectively arouse viewer's interest and attention to a video can be outputted.

In addition, in the present embodiment, the feeling degree determination section 190 determines the degree of feeling in comment information on the basis of the degree of interest determined for viewer attribute information corresponding to the comment information, and the comment output section 200 outputs a comment that is based on the comment information in a form according to the determined degree of feeling. Therefore, a comment for which the degree of interest is determined to be high can be outputted in an emphasized form, compared to the other comments, so that a comment that can more effectively arouse the viewer's interest and attention to the video can be outputted.

5. Modification

The present invention is not limited to the aforementioned embodiment.

(1) In the embodiment explained above, the common attribute information specification section 150 specifies, as common attribute information, a viewer attribute information item that has a point in common with distributor attribute information indicating an attribute of the distributor of a video, from among a plurality of viewer attribute information items acquired by the attribute information acquisition section 140, and the comment information selection section 170 selects at least one of a plurality of comment information items associated with a predetermined scene, on the basis of the common attribute information. Alternatively, the comment information selection section 170 may select comment information on the basis of the viewer attribute information that has a point in common with the distributor attribute information and viewer attribute information that has nothing in common. In this case, the video distribution apparatus 10 does not need to include the common attribute information specification section 150. In addition, the attribute information acquisition section 140 does not need to acquire distributor attribute information, and the interest degree determination section 180 may determine the degree of interest of the viewer only in the attribute indicated by the viewer attribute information. Also in this manner, a comment that can easily arouse viewer's interest and attention to the video can be outputted.

(2) In the embodiment explained above, in a case where a predetermined viewer (e.g., either the user B or C) makes access to the video distribution apparatus 10 through the user terminal 40, or in a case where a distributor of a video gives an instruction to output the video to the predetermined viewer, a comment is generated and is outputted together with a predetermined scene included in the video. This method is suitable for distribution of a video previously recorded by a distributor (recording and distributing). The present invention is applicable to a case where the distributor distributes a video in real time (live distribution).

In this case, the video information acquisition section 110 (see FIG. 3) acquires a video recorded at the game server 20 or the user terminal 40 and related information regarding the video in real time. The attribute information acquisition section 140 acquires the viewer attribute information regarding a plurality of viewers who are viewing the video, from information that has been collected by the attribute information collection section 120 and stored into the attribute information storage section 130. The comment information selection section 170 selects comment information associated with a predetermined scene included in the video, on the basis of the thus acquired viewer attribute information, and the comment output section 200 outputs a comment based on the selected comment information to a plurality of user terminals 40 being used by the plurality of viewers who are viewing the video. Accordingly, a comment that can easily arouse interest and attention of a viewer who is viewing a video in real time can be outputted.

Here, the common attribute information specification section 150 may specify, as common attribute information, a viewer attribute information item that has a point in common with distributor attribute information regarding the distributor of a video, among the acquired viewer attribute information items regarding a plurality of viewers. In addition, the common attribute information specification section 150 may specify, as common attribute information, an attribute information item that is common to a plurality of viewers, among the acquired viewer attribute information items regarding a plurality of viewers. For example, the common attribute information specification section 150 may specify, as common attribute information, attribute information that is common to at least a predetermined number of viewers, or may specify, as common attribute information, attribute information that is common to viewers who occupy at least a predetermined portion of all the viewers who are viewing the video. The comment information selection section 170 may select a plurality of comment information items associated with a predetermined scene included in the video, on the basis of the thus acquired common attribute information. Accordingly, a comment that can easily arouse interests and attentions of a plurality of viewers who are viewing the same video in real time can be outputted.

(3) A plurality of comment information items associated with a predetermined scene included in a video may include comment information for praising a distributor or comment information for dispraising the distributor. The comment information selection section 170 may preferentially select comment information for praising a distributor or may preferentially select comment information for dispraising the distributor, according to the settings indicated by setting information specified by the distributor.

In addition, the comment information selection section 170 may deduce a relationship between a viewer and a distributor on the basis of the viewer attribute information and the distributor attribute information, and may decide whether to preferentially select comment information for praising the distributor or preferentially select comment information for dispraising the distributor, on the basis of the deduced relationship. For example, in a case where comment information indicating that the number of reactions of the distributor is equal to or greater than a threshold is included in the viewer attribute information, since it is deduced that the viewer is in favor of the distributor, comment information for praising the distributor may preferentially be selected. In addition, in a case where the viewer attribute information or the distributor attribute information indicates that the viewer has been beaten many times by the distributor (the number of loses or the ratio of the number of loses with respect to the number of wins is equal to or greater than a threshold) in a predetermined match game, since it is deduced that the viewer has rivalry against the distributor, comment information for dispraising the distributor may preferentially be selected. As a result, a comment that can more effectively arouse the viewer's interest and attention to the video and the distributor can be outputted.

(4) In the embodiment explained above, the comment information selection section 170 selects at least one of a plurality of comment information items associated with each of the event information items E1 to E5, on the basis of the viewer attribute information. Alternatively, in a case where it is determined that a plurality of comment information items associated with the event information include comment information that is related to viewer attribute information, the comment information selection section 170 selects at least one comment information item on the basis of the viewer attribute information, and in a case where the plurality of comment information items do not include comment information that is related to viewer attribute information, the comment information selection section 170 may refrain from selecting comment information for the event information. In this case, for a scene corresponding to event information for which comment information is selected, the comment output section 200 may output a comment together with the scene. For a scene corresponding to even information for which no comment information is selected, the comment output section 200 does not need to output any comment together with the scene.

In the examples in FIG. 7, the comment information: "Fans of [professional baseball team] do whatever it takes to get items.", "You are miserably desperate. You will rummage through garbage in order to become [professional gamer].", and "You are hungrily hunting as if you were looking for souvenirs from [prefecture]." are associated with the event information item E3. Here, in a case where information related to a professional baseball team, a professional gamer, or a destination of a visit is not included in a plurality of viewer attribute information items acquired by the attribute information acquisition section 140 for a predetermined user, the comment information selection section 170 determines that none of the comment information items associated with the event information item E3 is associated with the viewer attribute information. Thus, it is not necessary to select comment information for the event information item E3. In this case, the comment output section 200 refrains from outputting any comment during the scene corresponding to the event information item E3.

The attribute information acquisition section 140 acquires different kinds of viewer attribute information for different viewers. For this reason, in which scene a comment is outputted varies according to viewers. Since scenes where no comment is outputted are provided according to viewers, a comment that cannot arouse the viewer's interest and attention can be inhibited from being outputted. Accordingly, the viewer's interest and attention to the video can be inhibited from being lost.

The invention claimed is:

1. A video distribution apparatus for distributing a video to a viewer, the video distribution apparatus comprising:
   circuitry configured to:
   acquire a plurality of viewer attribute information which indicate respective attributes of the viewer of a viewer who has made access to the video distribution apparatus;
   specify, as common attribute information, the viewer attribute information that has a point in common with distributor attribute information which indicates an attribute of a distributor of the video, from among the plurality of viewer attribute information items;
   determine a degree of interest of the viewer and a degree of interest of the distributor in an attribute indicated by the viewer attribute information specified as the common attribute information;
   specify at least one of the plurality of viewer attribute information items corresponding to the plurality of comment information items associated with the predetermined scene, based on the degree of interest of the viewer and the degree of interest of the distributor determined for each of the viewer attribute information items;
   select at least one of a plurality of comment information items stored in association with a predetermined scene included in the video, based on the specified viewer attribute information; and
   output, together with the predetermined scene included in the video, a comment based on the comment information item selected.

2. The video distribution apparatus according to claim 1, wherein the comment information includes a fixed phrase, and the circuitry is configured to output a comment that includes the fixed phrase included in the comment information and a word concerning the attribute indicated by the viewer attribute information.

3. The video distribution apparatus according to claim 1, wherein the circuitry is further configured to:

decide on a degree of feeling in the comment information on a basis of the degree of interest determined for the viewer attribute information corresponding to the comment information; and output the comment that is based on the comment information, in a form according to the degree of feeling.

4. The video distribution apparatus according to claim 1, wherein the circuitry is configured to select at least one of the plurality of comment information items associated with the predetermined scene, based on the viewer attribute information, in a case where any of the plurality of comment information items is determined to be related to the viewer attribute information, and select no comment information in a case where none of the plurality of comment information items associated with the predetermined scene are determined to be related to the viewer attribute information, and, in a case where the at least one comment information item is selected output, together with the predetermined scene, a comment that is based on the selected comment information item, and, in a case where none of the comment information items are selected output no comment together with the predetermined scene.

5. The video distribution apparatus according to claim 1, wherein the circuitry is configured to:

output the comment having a format based on the degree of interest determined for the viewer attribute information corresponding to the comment information.

6. The video distribution apparatus according to claim 1, wherein there are at least two viewers and the circuitry is configured to output different comments to different viewers.

7. A video distribution method comprising:

acquiring a plurality of viewer attribute information which indicate respective attributes viewer attribute information which indicates an attribute of a viewer who has made access to a video distribution apparatus;

specifying, as common attribute information, the viewer attribute information that has a point in common with distributor attribute information which indicates an attribute of a distributor of the video, from among the plurality of viewer attribute information items;

determining a degree of interest of the viewer and a degree of interest of the distributor in an attribute indicated by the viewer attribute information specified as the common attribute information;

specifying at least one of the plurality of viewer attribute information items corresponding to the plurality of comment information items associated with the predetermined scene, based on the degree of interest of the viewer and the degree of interest of the distributor determined for each of the viewer attribute information items;

selecting at least one of a plurality of comment information items stored in association with a predetermined scene included in the video, based on the specified viewer attribute information; and outputting, together with the predetermined scene included in the video, a comment that is based on the comment information selected in the selecting.

8. A non-transitory computer readable storage device that stores thereon a video distribution program for a computer, as a video distribution apparatus that distributes a video to a viewer, the program, when executed, causes the computer to:

acquire a plurality of viewer attribute information which indicate respective attributes of a viewer who has made access to the computer;

specify, as common attribute information, the viewer attribute information that has a point in common with distributor attribute information which indicates an attribute of a distributor of the video, from among the plurality of viewer attribute information items;

determine a degree of interest of the viewer and a degree of interest of the distributor in an attribute indicated by the viewer attribute information specified as the common attribute information;

specify at least one of the plurality of viewer attribute information items corresponding to the plurality of comment information items associated with the predetermined scene, based on the degree of interest of the viewer and the degree of interest of the distributor determined for each of the viewer attribute information items;

select at least one of a plurality of comment information items stored in association with a predetermined scene included in the video, based on the specified viewer attribute information; and output, together with the predetermined scene included in the video distributed to the viewer to who has made access to the video distribution apparatus, a comment that is based on the comment information selected by the comment information selection means.

9. The non-transitory computer readable storage device according to claim 8, wherein the comment information includes a fixed phrase and the program causes the computer to:

output a comment that includes the fixed phrase included in the comment information and a word concerning the attribute indicated by the viewer attribute information.

10. The non-transitory computer readable storage device according to claim 8, wherein the program causes the computer to:

decide on a degree of feeling in the comment information on a basis of the degree of interest determined for the viewer attribute information corresponding to the comment information; and output the comment that is based on the comment information, in a form according to the degree of feeling.

11. The non-transitory computer readable storage device according to claim 8, wherein the program causes the computer to:

output the comment having a format based on the degree of interest determined for the viewer attribute information corresponding to the comment information.

12. The non-transitory computer readable storage device according to claim 8, wherein the program causes the computer to:

select at least one of the plurality of comment information items associated with the predetermined scene, based on the viewer attribute information, in a case where any of the plurality of comment information items is determined to be related to the viewer attribute information, and select no comment information in a case where none of the plurality of comment information items associated with the predetermined scene are determined to be related to the viewer attribute information, and, in a case where the at least one comment information item is selected output, together with the predetermined scene, a comment that is based on the selected comment information item, and, in a case where none of the comment information items are selected output no comment together with the predetermined scene.

13. The non-transitory computer readable storage device according to claim 8, wherein there are at least two viewers and the program causes the computer to output different comments to different viewers.

* * * * *